Figure 1:
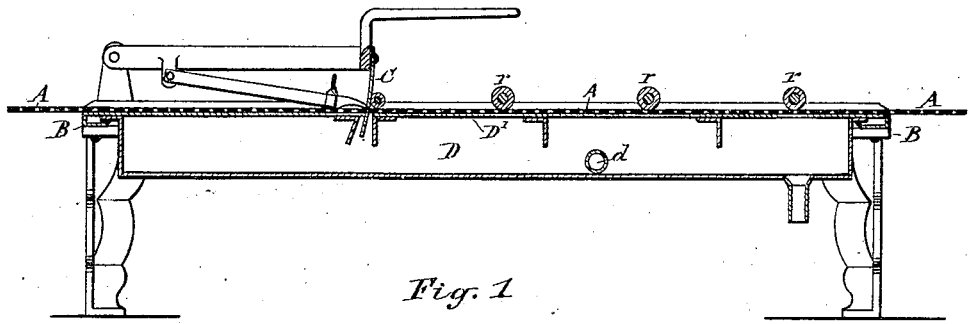
Figure 2:
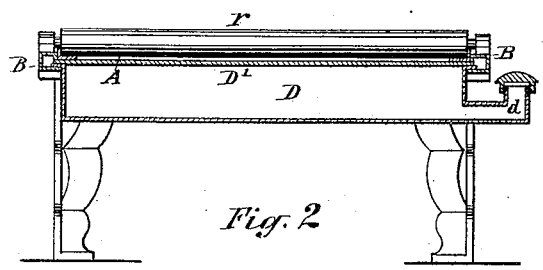

(No Model.)
B. L. SMITH.
Horse Rake.
No. 238,615. Patented March 8, 1881.
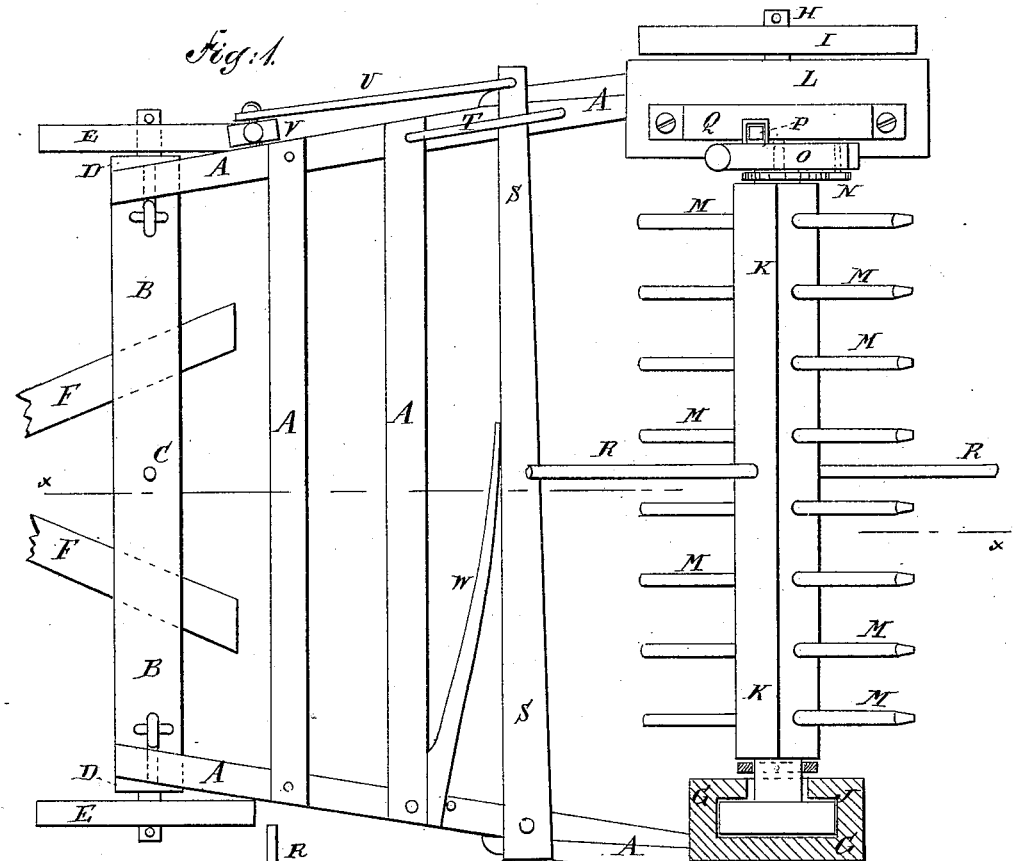
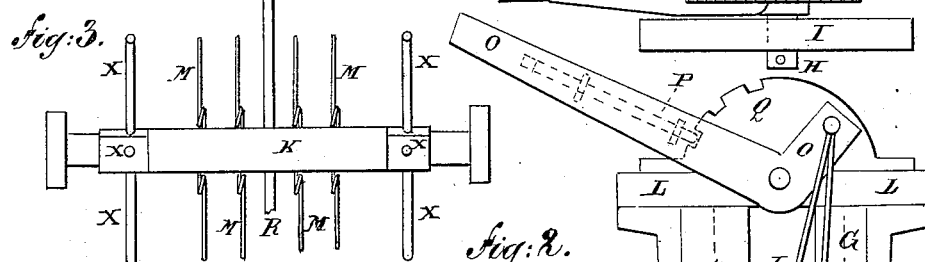
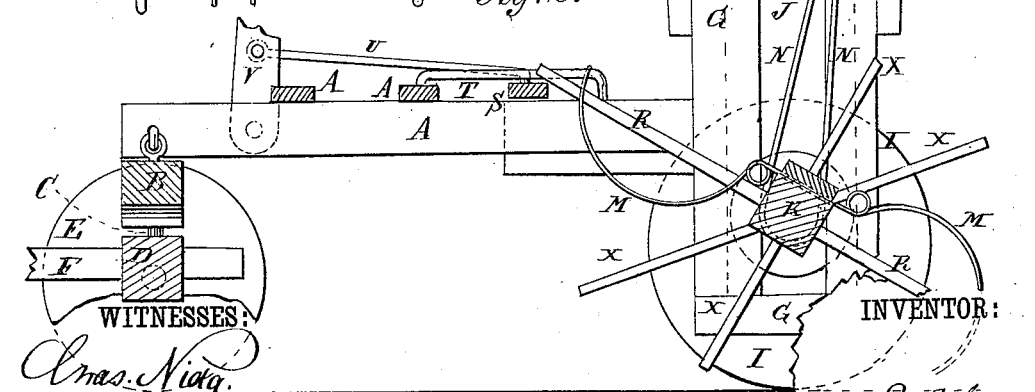
WITNESSES:
Chas. Nida
C. Sedgwick
INVENTOR:
B. L. Smith
BY Munn & Co
ATTORNEYS.

(No Model.)

F. R. SMITH.
Plaiting Machine.

No. 238,616. Patented March 8, 1881.

WITNESSES:
E. Laass
C. Bendixon

INVENTOR:
Franklin R. Smith
per Duell, Laass & Hey
attorneys